(12) United States Patent
Yamada

(10) Patent No.: US 10,274,857 B2
(45) Date of Patent: Apr. 30, 2019

(54) IMAGE READING APPARATUS AND IMAGE FORMING APPARATUS

(71) Applicant: CANON KABUSHIKI KAISHA, Tokyo (JP)

(72) Inventor: Kaname Yamada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/590,202

(22) Filed: May 9, 2017

(65) Prior Publication Data
US 2017/0336730 A1 Nov. 23, 2017

(30) Foreign Application Priority Data

May 20, 2016 (JP) ................................. 2016-101053

(51) Int. Cl.
H04N 1/04 (2006.01)
G03G 15/04 (2006.01)
G03G 15/20 (2006.01)
H04N 1/00 (2006.01)
G03G 15/00 (2006.01)

(52) U.S. Cl.
CPC ............. G03G 15/04 (2013.01); G03G 15/20 (2013.01); G03G 15/602 (2013.01); H04N 1/00519 (2013.01); H04N 1/00774 (2013.01); H04N 1/00795 (2013.01); H04N 2201/0081 (2013.01)

(58) Field of Classification Search
CPC ....... H04N 2201/0094; H04N 1/00588; H04N 2201/0081; H04N 1/0057; H04N 1/00748; H04N 1/06; H04N 1/113; H04N 1/00602; H04N 1/00737; H04N 1/00745; H04N 1/00795; H04N 1/00718; H04N 1/00774; H04N 1/4052; H04N 1/0032; H04N 1/00591; H04N 1/00604; H04N 1/00708
USPC ...... 358/498, 1.12, 1.13, 474, 1.1, 1.15, 1.2, 358/441, 448, 450, 488; 399/329, 33, 44, 399/49, 66; 271/258.01, 265.01, 3.14, 271/3.19
See application file for complete search history.

(56) References Cited

U.S. PATENT DOCUMENTS 4,000,942 A 1/1977 Ito et al.
5,274,402 A 12/1993 Serizawa et al.
(Continued)

FOREIGN PATENT DOCUMENTS

JP 2009-290441 A 12/2009

Primary Examiner — Negussie Worku
(74) Attorney, Agent, or Firm — Venable LLP

(57) ABSTRACT

An image reading apparatus includes a sheet conveyance unit conveying a sheet through a sheet conveyance path, a cover member supported by the sheet conveyance unit, the cover member being openable with respect to the sheet conveyance unit, and an image reading portion to read an image of the sheet conveyed by the sheet conveyance unit. In addition, a manipulator portion is manipulated to adjust a position of the image reading portion. The sheet conveyance unit can convey a sheet in such a manner that the sheet passes through the sheet conveyance path and the manipulator portion is covered by the cover member in a case where the cover member is positioned at a closed position, and both the sheet conveyance path and the manipulator portion are exposed to outside of the sheet conveyance unit in a case where the cover member is positioned at an open position.

20 Claims, 5 Drawing Sheets

(56) References Cited

U.S. PATENT DOCUMENTS

| | | | |
|---|---|---|---|
| 5,412,480 A | 5/1995 | Serizawa et al. | |
| 5,512,929 A | 4/1996 | Serizawa et al. | |
| 5,583,607 A * | 12/1996 | Fujioka | H04N 1/00572 355/25 |
| 5,946,539 A * | 8/1999 | Kurimoto | G03G 15/60 271/3.01 |
| 8,253,987 B2 * | 8/2012 | Fujioka | H04N 1/0284 358/474 |
| 8,493,640 B2 * | 7/2013 | Tamehira | H04N 1/123 358/474 |
| 9,843,692 B2 * | 12/2017 | Katayama | H04N 1/0057 |
| 2004/0246540 A1 * | 12/2004 | Makino | H04N 1/00013 358/498 |
| 2005/0047824 A1 * | 3/2005 | Kawai | G03G 15/0813 399/119 |
| 2007/0201923 A1 * | 8/2007 | Asada | B65H 1/266 399/405 |
| 2008/0203649 A1 * | 8/2008 | Watase | B65H 3/44 271/9.13 |
| 2008/0231913 A1 * | 9/2008 | Kurotsu | H04N 1/028 358/474 |
| 2011/0075168 A1 * | 3/2011 | Ikari | H04N 1/00687 358/1.9 |
| 2011/0141504 A1 * | 6/2011 | Utsunomiya | H04N 1/00681 358/1.9 |
| 2012/0155916 A1 * | 6/2012 | Ito | B41J 29/02 399/110 |
| 2013/0083367 A1 * | 4/2013 | Hara | G03G 15/602 358/449 |
| 2013/0322916 A1 * | 12/2013 | Tamura | G03G 21/169 399/98 |
| 2014/0177012 A1 * | 6/2014 | Kubo | H04N 1/123 358/474 |
| 2015/0373218 A1 * | 12/2015 | Watanabe | H04N 1/00705 358/448 |
| 2016/0185558 A1 * | 6/2016 | Kannichi | B65H 5/062 271/264 |
| 2016/0360046 A1 * | 12/2016 | Katayama | H04N 1/0057 |
| 2017/0048410 A1 * | 2/2017 | Noro | H04N 1/2032 |
| 2017/0149989 A1 * | 5/2017 | Watanabe | H04N 1/0057 |
| 2017/0171428 A1 * | 6/2017 | Kawano | H04N 1/00718 |
| 2017/0225915 A1 * | 8/2017 | Asada | B65H 1/26 |
| 2017/0331970 A1 * | 11/2017 | Osanai | H04N 1/0032 |
| 2017/0339294 A1 * | 11/2017 | Fukushima | H04N 1/00809 |

\* cited by examiner

IMAGE READING APPARATUS AND IMAGE FORMING APPARATUS

BACKGROUND OF THE INVENTION

Field of the Invention

The present invention relates to an image reading apparatus and an image forming apparatus, and more specifically to a configuration for adjusting a direction of an image reading portion.

Description of the Related Art

Hitherto, some image forming apparatus such as a copier and a facsimile machine include an image reading apparatus configured to optically read a document image by an image reading portion. Some image reading apparatus also includes an ADF (Auto Document Feeder) serving as an automatic document conveying apparatus provided above a body of the image reading apparatus and configured to feed a document from a supporting tray to a separation portion to separate and convey the document one by one. The image reading apparatus renders the conveyed document to pass through a part between a platen roller provided in the ADF and a skimming glass provided on an upper surface of the body of the image reading apparatus to read the document image at this time by the image reading portion.

Lately, there is proposed an image reading apparatus in which an image reading portion for reading an image of a rear surface of a document is disposed in an ADF to read front and rear surfaces of the document sheet when the document is conveyed once. In the case of such an image reading apparatus, it is necessary to make a leading edge, i.e., a downstream end in a conveyance direction, of the document in parallel with a reading line of the image reading portion on the ADF side to accurately read the rear surface image.

However, due to an allowance of components and the like, there is a case when a leading edge of the document being conveyed is not in parallel with a reading line of the image reading portion on the ADF side. Therefore, some prior art image reading apparatus is arranged to be able to adjust a direction of the image reading portion on the ADF side as disclosed in Japanese Patent Application Laid-open No. 2009-290441 for example. The image reading apparatus is arranged such that the image reading portion is fixed at an adjusted position after releasing fixation of the image reading portion on the ADF side and adjusting the direction of the image reading portion such that the leading edge of the document is in parallel with a reading line.

In the prior art image reading apparatus configured as described above, the image reading portion on the ADF side is disposed under a document conveyance path provided in the ADF. Due to that, in order to adjust the direction of the image reading portion, it is necessary to open an opening/closing cover defining an upper surface of the document conveyance path at first and then to remove a guide defining a bottom surface of the document conveyance path. Thus, it is necessary to remove several components by performing time-consuming works to adjust the image reading portion on the ADF side. Therefore, an image reading apparatus enabling to simply adjust the direction of the image reading portion is demanded.

SUMMARY OF THE INVENTION

According to one aspect of the present invention, an image reading apparatus, including a first body, a sheet conveyance portion configured to convey a sheet through a sheet conveyance path provided in the first body, the sheet to be conveyed by the sheet conveyance portion passing through the sheet conveyance path, an opening/closing member provided openably with respect to the first body and configured to open a part of the sheet conveyance path in response to its opening, a first image reading portion configured to read an image of the sheet conveyed by the sheet conveyance portion at a reading position, and an adjustor portion configured to adjust a position of the first image reading portion. The adjustor portion includes a manipulator portion manipulated in making an adjustment of the position of the first image reading portion and disposed to be exposed in a state in which the opening/closing member is opened.

Further features of the present invention will become apparent from the following description of exemplary embodiments with reference to the attached drawings.

DESCRIPTION OF THE EMBODIMENTS

Figure 1:
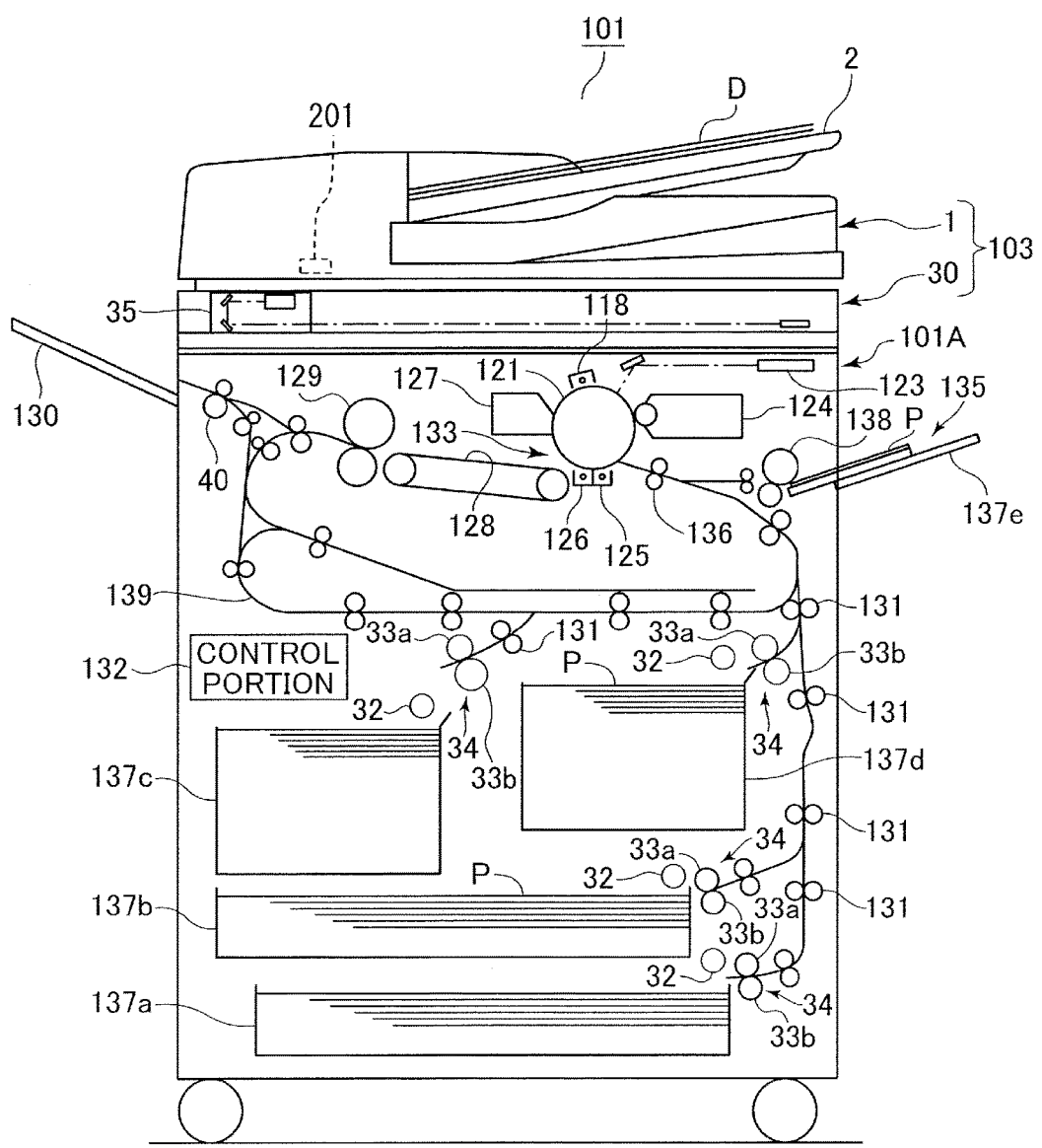
FIG. 1 is a section view schematically illustrating a configuration of an image forming apparatus including an image reading apparatus of an embodiment of the present disclosure.

An embodiment of the present disclosure will be described below with reference to the drawings. FIG. 1 is a schematic section view illustrating a configuration of an image forming apparatus including an image reading apparatus of the present embodiment of the present disclosure. As illustrated in FIG. 1, the image forming apparatus 101 includes the image reading apparatus 103 and an image forming apparatus body 101A. The image reading apparatus 101 is configured to read an image on a document sheet D supported on a document supporting tray 2 serving as a sheet supporting portion. The image forming apparatus body 101A includes an image forming portion 133 which is configured to form an image onto a sheet based on image information read by the image reading apparatus 103. The image forming apparatus 101 also includes a control portion 132 configured to control an image forming operation of the image forming portion 133, an image reading operation of the image reading apparatus 103, and others. The document sheet to be conveyed to a document conveyance path R described later is supported on the document supporting tray 2.

The image reading apparatus 103 includes a scanner portion 30 serving as a body of the image reading apparatus, i.e., a second bode, and an ADF 1 serving as a sheet conveying apparatus provided openably on the scanner portion 30. The scanner portion 30 is provided, movably in a sub-scan direction, with a first scanner unit 35 serving as a second image reading portion including a lamp configured to project light to a document, a reflector and a reduction optical system guiding and reducing the light reflected from the document sheet to a photoelectric element. The first scanner unit 35 is configured to read an image on a first surface, opposite from a second surface read by a second scanner unit 201 described later, of the document sheet which is conveyed through the document conveyance path R.

The ADF 1 separates the document sheet D supported on the document supporting tray 2 and conveys the separated document sheet D to an image reading position of the first scanner unit 35. The ADF 1 also includes the second scanner unit 201 serving as a first image reading portion reading the image of the second surface on the side opposite from the first surface whose image is read by the first scanner unit 35. That is, the second scanner unit 201 is configured to be able to read the image of the sheet conveyed by a document conveyance portion 200 at a reading position.

The image forming apparatus body 101A includes an image forming portion 133, a sheet feed portion 34 feeding the sheet P to the image forming portion 133, and a manual sheet feed portion 135. The image forming apparatus body 101A also includes a discharge roller pair 40 configured to discharge the sheet P on which an image has been formed out of the image forming apparatus body 101A and a sheet discharge tray 130 on which the discharged sheet P is supported.

The image forming portion 133 includes a photosensitive drum 121 on which a toner image is formed, a laser scanner unit 123 configured to irradiate the photosensitive drum 121 with a laser beam, a transfer electrifier 125 configured to transfer the toner image onto the sheet P, a fixing unit 129 configured to fix the toner image onto the sheet, and others. The sheet feed portion 34 includes sheet feed cassettes 137a, 137b, 137c, and 137d in which the sheet P is supported, a feed roller 32 feeding the sheet P within the sheet feed cassette, a conveyance roller 33a and a separation roller 33b conveying the sheet P while separating one by one.

Next, an image forming operation of the image forming apparatus 101 constructed as described above will be described. In response to an image reading signal outputted from the control portion 132 to the image reading apparatus 103, the document sheet D is conveyed by the ADF 1 and is read by the first scanner unit 35. It is noted that in the case when images are formed on both front and rear surfaces of the document sheet, the first scanner unit 35 reads the first surface of the document sheet and the second scanner unit 201 provided in the ADF 1 reads the second surface of the document sheet. Then, the control portion 132 transforms the read document images (image information) into electrical signals and forms image data (image read information) based on the electrical signals.

After that, the laser scanner unit 123 irradiates the photosensitive drum 121 with a laser beam corresponding to the image data. At this time, the surface of the photosensitive drum 121 is electrified beforehand by the electrifier 118, so that an electrostatic latent image is formed on the photosensitive drum 121 when it is irradiated with the laser beam. In succession, the electrostatic latent image is developed by the developing unit 124 and a toner image is formed on the photosensitive drum 121.

Meanwhile, in parallel with the operation of forming the toner image on the surface of the photosensitive drum 121, a sheet feed signal is outputted from the control portion 132 to the sheet feed portion 34 or the manual sheet feed portion 135. Thereby, the sheet P selected out of various sizes of sheets stored in the sheet feed cassettes 137a, 137b, 137c and 137d is fed by the feed roller 32 or a sheet P supported on a manual tray 137e is fed by a manual feed roller 138. The sheet P fed by the feed roller 32 is nipped and separated one by one at a separation nip portion between the conveyance roller 33a and the separation roller 33b. Then, the sheet P is conveyed to the registration roller pair 136 by the conveyance roller 131. The sheet P fed by the manual feed roller 138 is also conveyed to the registration roller pair 136.

Then, a skew of the sheet P is corrected by the registration roller pair 136 and is supplied between the photosensitive drum 121 and the transfer electrifier 125 in synchronism with the toner image on the photosensitive drum 121. Thereby, the toner image on the photosensitive drum 121 is transferred onto the sheet P by the transfer electrifier 125. After that, the sheet P is separated from the photosensitive drum 121 by a separation electrifier 126. It is noted that the surface of the photosensitive drum 121 from which the toner image has been transferred is cleaned by the cleaner 127, and the electrifier 118 electrifies the surface of the photosensitive drum 121 to be ready for a next exposure.

The sheet P onto which the toner image has been transferred is conveyed to the fixing unit 129 by the conveyance portion 128 to fix the toner image onto the surface of the sheet P by heat and pressure applied at the fixing unit 129. Then, the sheet P onto which the toner image has been fixed is discharged to and stacked sequentially on the sheet discharge tray 130 by the discharge roller pair 40. It is noted that in a case where images are to be formed on both surfaces of the sheet P, the sheet P is conveyed again to the registration roller pair 136 through a reverse conveyance path 139 after fixing the image on a first surface of the sheet P. After that, the operation described above is repeated to form an image on a second surface of the sheet P.

Figure 2:
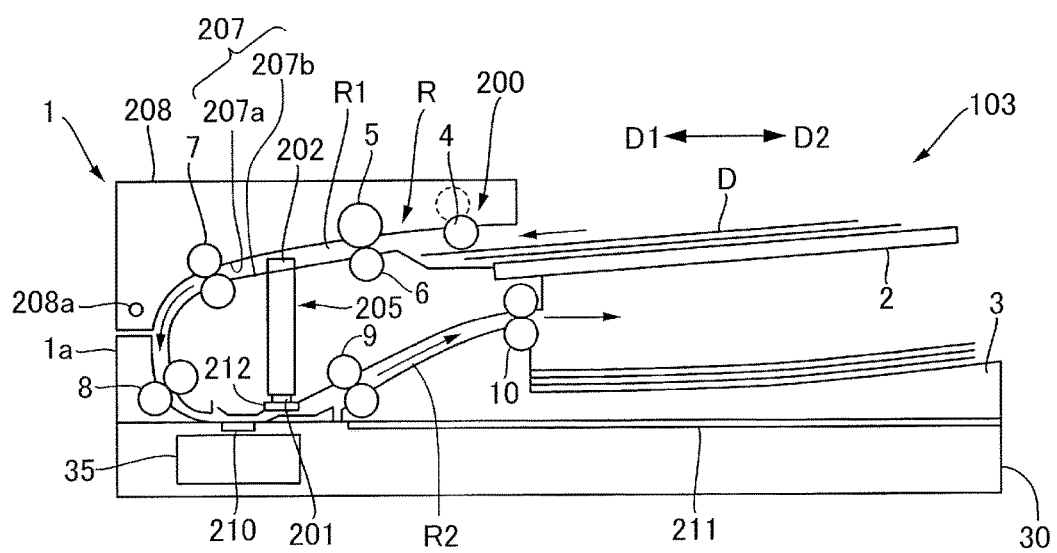
FIG. 2 illustrates a configuration of an ADF provided in the image reading apparatus.

As illustrated in FIG. 2, the ADF 1 includes a document conveyance portion 200 serving as a sheet conveyance portion and the second scanner unit 201 configured to read the image of the second surface of the document sheet D conveyed by the document conveyance portion 200. The ADF 1 also includes a document conveyance path R which is a sheet conveyance path through which the document sheet conveyed by the document conveyance portion 200 passes. The document conveyance portion 200 conveys the document sheet through the document conveyance path R provided in an ADF body 1a. That is, the document sheet conveyed by the document conveyance portion 200 passes through the document conveyance path R provided in an ADF body 1a.

The document conveyance portion 200 conveys the document sheet to image reading positions of the first and second scanner units 35 and 201. The document conveyance portion 200 includes a document feed roller 4 feeding the document sheet D supported on the document supporting tray 2, a pair of separation rollers 5 and 6 configured to separate the document sheet D one by one, a registration roller pair 7 configured to correct a skew of the document sheet D, a first conveyance roller pair 8, a second conveyance roller pair 9, and others. The second scanner unit 201 is disposed so as to face a surface on a side guided by a first guide portion 207a described later of the document sheet conveyed through the document conveyance path R. Still further, provided on an upper surface of the scanner portion 30 are a skimming glass 210 and a document glass 211 disposed in parallel with the skimming glass 210 in a sub-scan direction. A platen glass 212 is provided under the second scanner unit 201.

According to the present embodiment, the image reading apparatus 103 is configured to read the document sheet in either mode of a skimming mode, i.e., an ADF document reading mode, and a fixed reading mode, i.e., a document glass document reading mode, selected by a user. The skimming mode is a mode of reading images of one surface or both surfaces of the document sheet by passing the document sheet above the first scanner unit 35 and under the second scanner unit 201 by the ADF 1. The fixing reading mode is a mode of reading the image of the document sheet placed on the document glass 211 by the user while moving the first scanner unit 35 in the sub-scan direction.

It is noted that the ADF 1 is supported openably (turnably) in a vertical direction with respect to the scanner portion 30 by a hinge portion not illustrated and disposed on a back side in FIG. 2 such that an upper part of the ADF 1 above the document glass 211 is openable from a front side in FIG. 2. Then, in the case of the fixed reading mode, the document is placed on the document glass by clearing a top of the document glass 211 by turning the ADF 1 upward.

Next, an image reading operation in the skimming mode of the image reading apparatus 103 constructed as described above will be described. In the case of the skimming mode, the document sheet D placed on the document supporting tray 2 is fed by the document feed roller 4 at first. Then, the document sheet D is separated one by one by the pair of separation rollers 5 and 6 and is conveyed through the document conveyance path R to a nip portion of the registration roller pair 7 in a resting state. Thereby, the document sheet D stops in a condition in which a leading edge thereof is in contact with the nip portion of the registration roller pair 7. Then, a skew of the document sheet D is corrected because the leading edge of the document sheet D follows the nip portion of the registration roller pair 7 and an inclination of the document sheet D is eliminated.

After the correction of the skew, the document sheet D is conveyed to the first conveyance roller pair 8 by the registration roller pair 7 and is passed above the skimming glass 210 by the first conveyance roller pair 8 to read the image of the first surface of the document sheet D. Here, if an instruction has been made by the user so as to read also the second surface of the document sheet D, the control portion 132 controls so as to read the image of the second surface of the document sheet D by the second scanner unit 201 after reading the first surface and when the document sheet D passes through an under surface of the platen glass 212. Then, after reading the images, the document sheet D is discharged to the document discharge portion 3 serving as a sheet discharge portion by a second conveyance roller pair 9 and a discharge roller pair 10. The document discharge portion 3 is disposed under the document supporting tray 2 such that the document sheet discharged out of the document conveyance path R is stacked thereon.

Here, the document conveyance path R continuously includes a first conveyance path R1 and a second conveyance path R2. The document sheet supplied from the document supporting tray 2 is conveyed through the first conveyance path R1 in a first direction D1. The second conveyance path R2 is disposed under the first conveyance path R1, and the document sheet conveyed through the first conveyance path R1 is directed to a second direction D2 opposite to the first direction D1 and is guided to the document sheet discharge portion 3.

By the way, the document conveyance path R is defined by a conveyance guide 207 serving as a guide member, and a part of the document conveyance path R is opened/closed when an opening/closing cover 208 serving as an opening/closing member provided openably/closably to the ADF body 1a, i.e., a body of the sheet conveying apparatus or a first body, is opened/closed at a fulcrum of a shaft 208a. That is, the opening/closing cover 208 is provided openably/closably with respect to the ADF body 1a, and the part of the document conveyance path R is opened when the opening/closing cover 208 is opened. The document conveyance path R is opened by turning the opening/closing cover 208 upward in performing such operations as unjamming. The conveyance guide 207 includes first and second guide portions 207a and 207b defining the document conveyance path R. The first guide portion 207a is provided in the ADF body 1a, and the second guide portion 207b is provided in the opening/closing cover 208 of the document conveyance path R.

Figure 3:
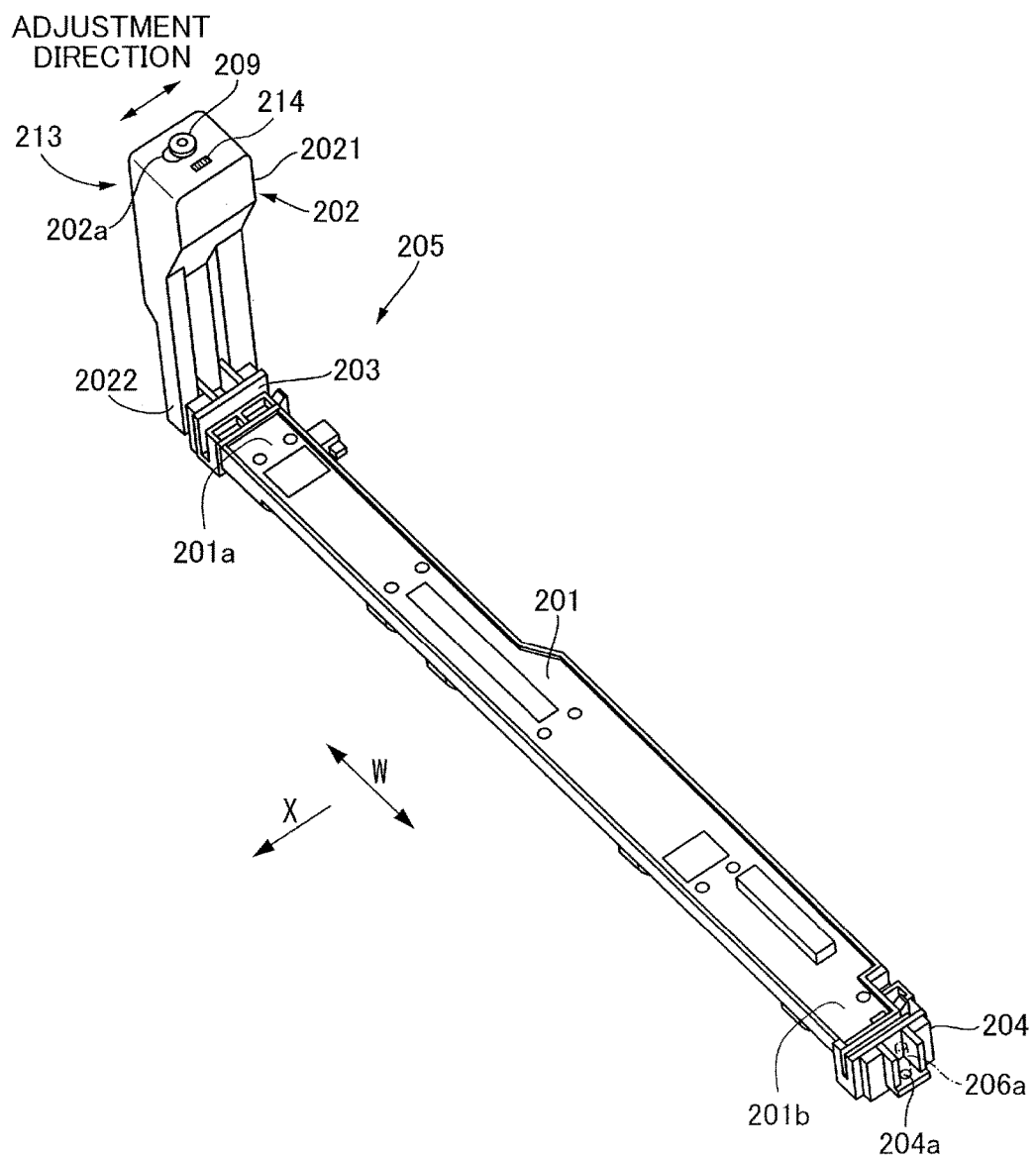
FIG. 3 is a perspective view illustrating a configuration of an adjustor portion configured to adjust a direction of a second scanner unit provided on the ADF.

Still further, as illustrated in FIG. 3, a turn supporting member 204 serving as a turning portion is engagedly fixed at one end side (second end portion) 201b, i.e., the back side in the present embodiment, in a scan direction, i.e., a widthwise direction W, orthogonal to a document conveying direction, i.e., a sheet conveyance direction X, of the second scanner unit 201 in the present embodiment. That is, the turn supporting member 204 is provided at the one end side 201b, opposite from another end side (first end portion) 201a in the scan direction, of the second scanner unit 201. The turn supporting member 204 is provided with an insertion hole 204a through which a boss or a shaft provided in the ADF body 1a is inserted. Then, the second scanner unit 201 is held by the turn supporting member 204 turnably with respect to the ADF body 1a at a fulcrum of the boss 206a.

Attached at the another end side 201a or at the front side in the present embodiment opposite from the one end side 201b in the scan direction W of the second scanner unit 201 is a manipulator portion 202. The manipulator portion 202 is manipulated when an adjustment of a direction of the second scanner unit 201 is made such that a reading line of the second scanner unit 201 is in parallel with a leading edge, i.e., a downstream end in the sheet conveyance direction, of the document sheet D. Here, the manipulator portion 202 includes an upper end portion, i.e., an opening/closing member side end portion, 2021 provided on a side closer to the opening/closing cover 208 and a lower end portion, i.e., a reading portion side end portion, 2022 provided on a side closer to the second scanner unit 201 of the manipulator portion 202.

As illustrated in FIG. 2, the upper end portion 2021 of the manipulator portion 202 projects above the first guide portion 207a of the conveyance guide 207, i.e., toward the opening/closing cover 208 side. Therefore, the upper end portion 2021 of the manipulator portion 202 projects to the opening/closing cover 208 side out of the first guide portion 207a and is exposed when the opening/closing cover 208 is opened. According to the present embodiment, the lower end portion 2022, i.e., an end portion on the side opposite from the upper end portion 2021, of the manipulator portion 202 is attached to the second scanner unit 201 through a holding member 203. That is, the lower end portion 2022 engages with the other end, i.e., the first end portion, in the scan direction W of the second scanner unit 201.

Thereby, when the opening/closing cover 208 is opened upward, the upper end portion 2021 of the manipulator portion 202 is exposed outside and it becomes possible to manipulate the manipulator portion 202. Then, it becomes possible to adjust the direction or the position of the second scanner unit 201 by turning the second scanner unit 201 at a fulcrum of the boss 206a by opening the opening/closing cover 208 and by manipulating the manipulator portion 202.

Thus, according to the present embodiment, the manipulator portion 202 and the turn supporting member 204 compose an adjustor portion 205 configured to adjust the direction of the second scanner unit 201. That is, the adjustor portion 205 includes the manipulator portion 202 manipulated in the adjustment of the direction of the second scanner unit 201 and exposed when the opening/closing cover 208 is opened. It is thus possible to adjust the position of the second scanner unit 201 by the adjustor portion 205 when seen from a direction vertical to a surface of the sheet at the reading position. Still further, the adjustor portion 205 is disposed between the first conveyance path R1 and the second conveyance path R2. A part of the adjustor portion 205 is disposed so as to be covered by the first guide portion 207a when the opening/closing cover 208 is opened. The manipulator portion 202 is exposed above the first conveyance path R1 when the opening/closing cover 208 is opened.

Figure 4A:
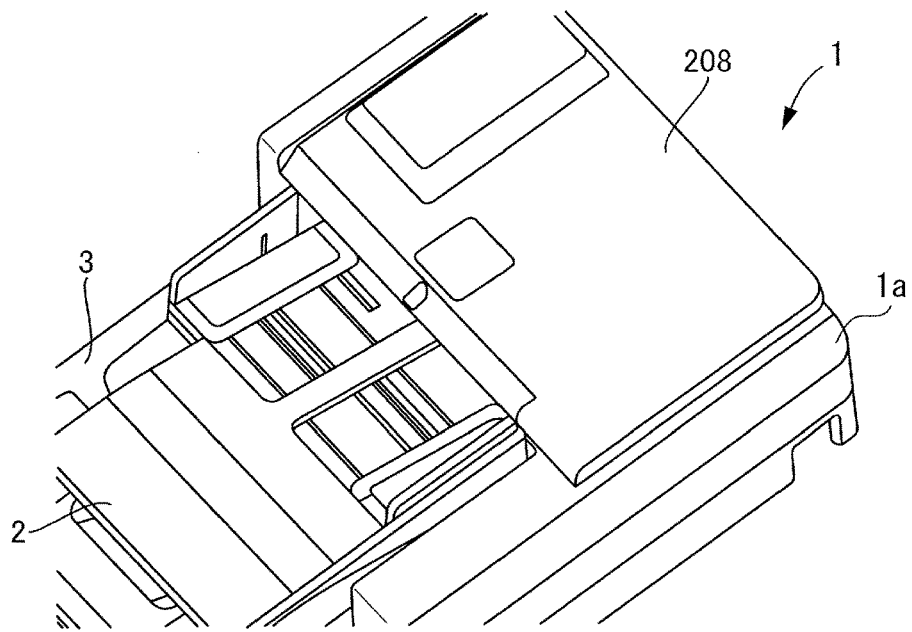
FIG. 4A is a perspective view illustrating a condition in which an opening/closing cover of the ADF is closed.
Figure 4B:
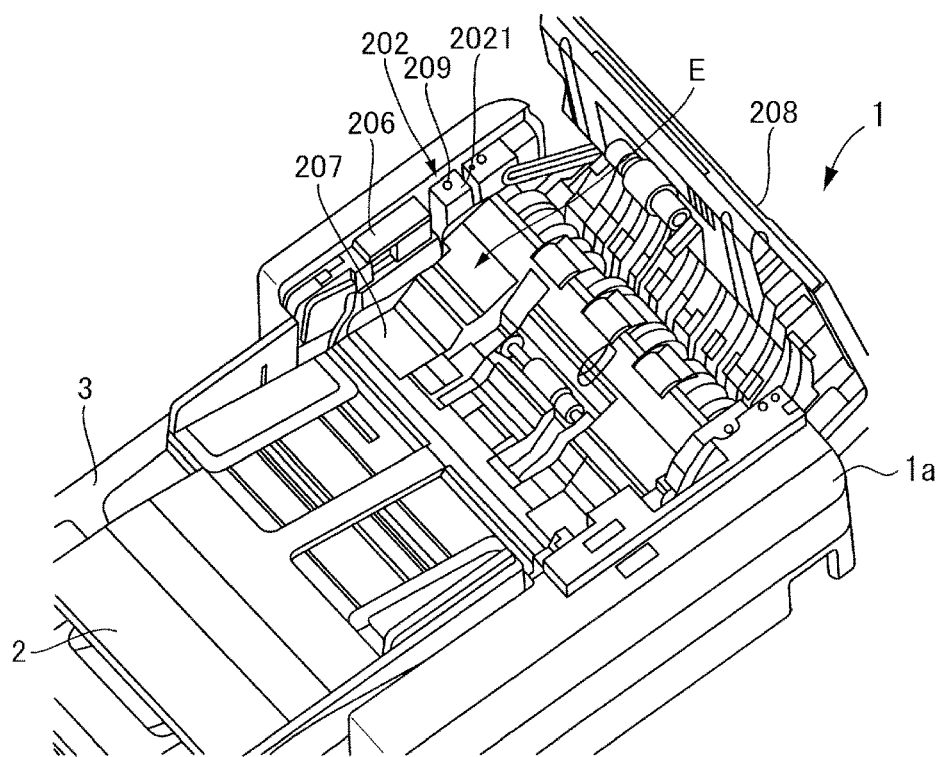
FIG. 4B is a perspective view illustrating a condition in which the opening/closing cover of the ADF is opened.

Next, a method for adjusting the second scanner unit 201 by the adjustor portion 205 will be described. As illustrated in FIG. 4A, the opening/closing cover 208 is normally closed. Then, in a case when the adjustment of the second scanner unit 201 is to be made, the opening/closing cover 208 is opened as illustrated in FIG. 4B at first to expose the upper end portion 2021 of the manipulator portion 202. At this time, the manipulator portion 202 is fixed by a fixing portion 213 (see FIG. 3) to a frame 206 of the ADF body 1a provided outside of a sheet conveying area E of the document conveyance path R. That is, the fixing portion 213 fixes the manipulator portion 202 to the ADF body 1a.

It is noted that as illustrated in FIG. 3, the fixing portion 213 includes a portion of the manipulator portion 202 defining a long-hole shaped insertion hole 202a lengthy in a manipulation direction of the manipulator portion 202 and penetrating through the manipulator portion 202, and a screw 209 serving as a fixing member which is inserted into the insertion hole 202a and whose one end is configured for fixing to a screw hole not illustrated and defined on a bottom surface of the frame 206. The manipulator portion 202 is also provided with a scale 214 adjacent the screw 209 on an end surface of the upper end portion 2021. The scale 214 is provided so as to correspond to a turning angle of the turn supporting member 204.

Figure 5A:
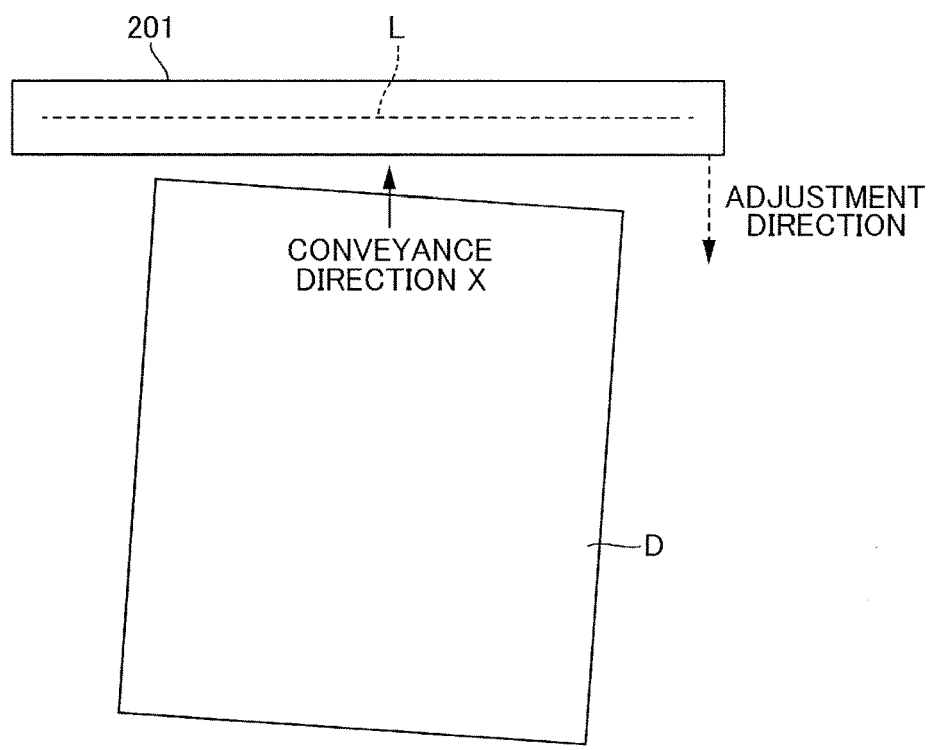
FIG. 5A illustrates a relationship between the second scanner unit and a document leading edge before an adjustment of the second scanner unit is made.
Figure 5B:
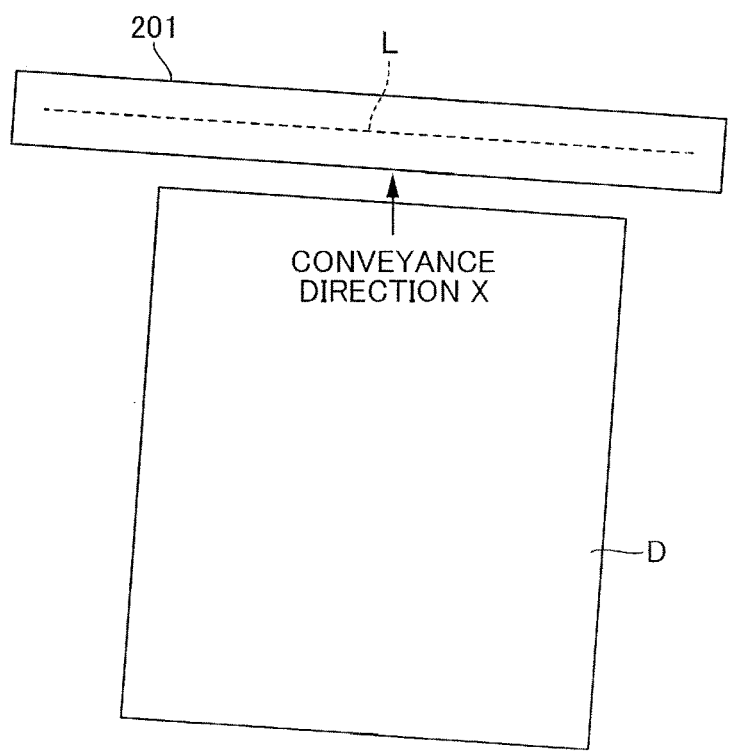
FIG. 5B illustrates a relationship between the second scanner unit and the leading edge after the adjustment has been made.

FIGS. 5A and 5B illustrate conditions of the document sheet D at the document reading position of the second scanner unit 201 when seen from a direction perpendicular to a document surface of the document sheet D. Here, the screw 209 is loosened or is removed to release the fixation of the manipulator portion 202 at first when a reading line L of the second scanner unit 201 is not in parallel with a leading edge line in a conveyance direction X of the document sheet D as illustrated in FIG. 5A. After that, the manipulator portion 202 is moved in an adjustment direction as indicated by an arrow in FIG. 3. Thereby, the second scanner unit 201 turns at a fulcrum of the boss 206a, and the reading line L of the second scanner unit 201 can be in parallel with the leading edge line in the conveyance direction X of the document sheet D as illustrated in FIG. 5B. At this time, it is possible to make the adjustment while confirming an adjustment amount by making reference to the scale 214.

It is noted that the screw 209 is fastened to fix the manipulator portion 202 to the frame 206 after making the reading line L of the second scanner unit 201 in parallel with the leading edge line in the conveyance direction X of the document sheet D by manipulating the manipulator portion 202. This arrangement makes it possible to read an image stably by the second scanner unit 201.

As described above, the image reading apparatus 103 of the present embodiment includes the ADF body 1a, the document conveyance path R through which the document sheet is conveyed, the opening/closing cover 208, the second scanner unit 201, and the adjustor portion 205. The adjustor portion 205 includes the manipulator portion 202 disposed so as to be exposed when the opening/closing cover 208 is opened and manipulated during the adjustment. According to the present embodiment, the manipulator portion 202 composing the adjustor portion 205 is exposed when the opening/closing cover 208 is opened, so that it becomes possible to manipulate the manipulator portion 202. This arrangement makes it possible to adjust the direction of the second scanner unit 201 simply just by opening the opening/closing cover 208 and by manipulating the manipulator portion 202, so that a time-consuming work in the adjustment of the second scanner unit 201 can be cut.

It is noted that while the case when the manipulator portion 202 is disposed at the front side of the image reading apparatus 103 has been described above, the manipulator portion 202 may be disposed on a back side of the image reading apparatus 103. Still further, the case where the manipulator portion 202 is fixed to the frame 206 has been described above, the present disclosure is not limited to such case and the manipulator portion 202 may be fixed to the conveyance guide 207.

Still further, while the case where the upper end portion 2021 of the manipulator portion 202 projects out of the conveyance guide 207 to the opening/closing cover 208 side such that the manipulator portion 202 is exposed when the opening/closing cover 208 is opened has been described above, the present disclosure is not limited to such case. The upper end portion 2021 of the manipulator portion 202 may be located at a position below a level of a top surface of the first guide portion 207a as long as the manipulator portion 202 is exposed and can be manipulated in a condition in which the opening/closing cover 208 is opened.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-101053, filed May 20, 2016, which is hereby incorporated by reference herein in its entirety.

What is claimed is:

1. An image reading apparatus comprising:
 a cover member openable with respect to a main body of the image reading apparatus;
 a first guide portion provided on the main body of the image reading apparatus;
 a second guide portion provided on the cover member, a sheet conveyance path for conveying a sheet being formed by the first guide portion and the second guide portion in a case where the cover member is positioned in a closed position;
 an image reading portion configured to read an image of the sheet conveyed through the sheet conveyance path; and
 a manipulator portion configured to be manipulated to adjust a position of the image reading portion, wherein the manipulator portion is provided outside of a sheet conveying area of the sheet conveyance path in a width direction orthogonal to a sheet conveyance direction, wherein the manipulator portion is covered by the cover member in a case where the cover member is positioned at the closed position, and the manipulator portion is exposed in a case where the cover member is positioned at an open position.

2. The image reading apparatus according to claim 1, further comprising an adjustor portion comprising the manipulator portion and configured to adjust the position of the image reading apparatus, wherein a part of the adjustor portion is disposed to be covered by the first guide portion.

3. The image reading apparatus according to claim 1, wherein the image reading portion is disposed to face a surface on a side guided by the first guide portion of the sheet conveyed through the sheet conveyance path.

4. The image reading apparatus according to claim 1, further comprising:

a sheet supporting portion on which the sheet conveyed through the sheet conveyance path is supported; and a sheet discharge portion which is disposed under the sheet supporting portion and on which the sheet discharged out of the sheet conveyance path is supported.

5. The image reading apparatus according to claim 1, further comprising:

an image reading apparatus body configured to support the main body rotatably; and a body side image reading portion provided in the image reading apparatus body to read an image of the sheet conveyed through the sheet conveyance path, wherein the body side image reading portion is configured to read an image on a surface, opposite from a surface read by the image reading portion, of the sheet conveyed through the sheet conveyance path.

6. The image reading apparatus according to claim 1, wherein the manipulator portion comprises a cover member side end portion provided on a side closer to the cover member of the manipulator portion and a reading portion side end portion provided on a side closer to the image reading portion of the manipulator portion, wherein the cover member side end portion is exposed to the outside of the main body in a state in which the cover member is open.

7. The image reading apparatus according to claim 6, wherein the reading portion side end portion of the manipulator portion engages with a first end portion in a scan direction of the image reading portion.

8. The image reading apparatus according to claim 7, wherein the image reading portion is configured to turn at a fulcrum of a second end portion, opposite from the first end portion in the scan direction, of the image reading portion.

9. The image reading apparatus according to claim 8, wherein the manipulator portion comprises a scale corresponding to a position of the image reading portion.

10. The image reading apparatus according to claim 8, further comprising a fixing portion configured to fix the manipulator portion to the sheet conveyance path.

11. The image reading apparatus according to claim 10, wherein the fixing portion comprises a portion of the manipulator portion defining a long-hole shaped insertion hole elongated in a manipulation direction of the manipulator portion and penetrating through the manipulator portion, and a fixing member which is inserted into the long-hole shaped insertion hole and whose one end is configured for fixing to a frame of the main body or a guide member defining the sheet conveyance path.

12. The image reading apparatus according to claim 1, wherein at least a part of the manipulator portion projects out of the first guide portion toward the cover member side.

13. The image reading apparatus according to claim 1, wherein the manipulator portion is disposed to be exposed when viewed in a direction perpendicular to a surface of the sheet at a reading position at which the image reading portion reads an image of the sheet in a state in which the cover member is open.

14. An image forming apparatus comprising:

the image reading apparatus as set forth in claim 1; and an image forming portion configured to form an image onto a sheet based on image information read by the image reading apparatus.

15. The image reading apparatus according to claim 1, wherein the manipulator portion is configured to adjust, by being manipulated, a position of the image reading portion in a turning direction centering on an axis extending in a direction intersecting with a surface of a sheet positioned at a reading position at which the image reading portion reads an image of the sheet conveyed through the sheet conveyance path.

16. The image reading apparatus according to claim 1, wherein the manipulator portion is provided outside of a sheet conveying area of the sheet conveyance path in a width direction orthogonal to a sheet conveyance direction.

17. An image reading apparatus comprising:

a cover member openable with respect to a main body of the image reading apparatus;

a first guide portion provided on the main body of the image reading apparatus;

a second guide portion provided on the cover member, a sheet conveyance path for conveying a sheet being formed by the first guide portion and the second guide portion in a case where the cover member is positioned in a closed position;

an image reading portion configured to read an image of the sheet conveyed through the sheet conveyance path; and a manipulator portion configured to be manipulated to adjust a position of the image reading portion, wherein the manipulator portion is disabled to be manipulated in a case where the cover member is positioned at the closed position, and the manipulator portion is enabled to be manipulated in a case where the cover member is positioned at an open position.

18. The image reading apparatus according to claim 17, further comprising:

a sheet supporting portion on which the sheet conveyed to the sheet conveyance path is supported; and a sheet discharge portion which is disposed under the sheet supporting portion and on which the sheet discharged out of the sheet conveyance path is supported.

19. The image reading apparatus according to claim 17, wherein the manipulator portion is configured to adjust, by being manipulated, a position of the image reading portion in a turning direction centering on an axis extending in a direction intersecting with a surface of a sheet positioned at a reading position at which the image reading portion reads an image of the sheet conveyed through the sheet conveyance path.

20. The image reading apparatus according to claim 17, wherein the manipulator portion is provided outside of a sheet conveying area of the sheet conveyance path in a width direction orthogonal to a sheet conveyance direction.

* * * * *